United States Patent [19]

Imai et al.

[11] Patent Number: 5,323,144
[45] Date of Patent: Jun. 21, 1994

[54] DUPLEXED BUS TYPE NETWORK WITH FAILURE CHANGEOVER

[75] Inventors: Mitsuo Imai; Yasumasa Imai; Yasuo Suzuki; Teruaki Aoki, all of Hitachi, Japan

[73] Assignee: Hitachi Cable Limited, Tokyo, Japan

[21] Appl. No.: 635,594

[22] PCT Filed: Apr. 18, 1990

[86] PCT No.: PCT/JP90/00502
§ 371 Date: Jan. 31, 1991
§ 102(e) Date: Jan. 31, 1991

[87] PCT Pub. No.: WO90/13193
PCT Pub. Date: Nov. 1, 1990

[30] Foreign Application Priority Data

Apr. 19, 1989 [JP] Japan ............................ 1-97575
Jul. 7, 1989 [JP] Japan ............................ 1-174156
Aug. 23, 1989 [JP] Japan ............................ 1-215002
Sep. 19, 1989 [JP] Japan ............................ 1-243049
Sep. 19, 1989 [JP] Japan ............................ 1-243050

[51] Int. Cl.$^5$ .......................................... H04L 1/00
[52] U.S. Cl. .......................... 340/825.01; 340/825.16; 370/85.13

[58] Field of Search ............ 340/825.01, 825.06, 340/825.16, 827; 370/24, 25, 26, 28, 31, 32, 85.12, 85.13

[56] References Cited

U.S. PATENT DOCUMENTS

4,748,560 5/1988 Kataoka ........................ 370/85.9
4,977,557 12/1990 Phung et al. .................. 370/85.9

Primary Examiner—Donald J. Yusko
Assistant Examiner—John Giust
Attorney, Agent, or Firm—Dykema Gossett

[57] ABSTRACT

A duplexed bus type network in which a main transmission line and a stand-by transmission line are interconnected by a repeater (30), a changeover switch (40) or a two-way amplifier, a modem at each station is duplexed and connected to the main transmission line and the stand-by transmission line, and, upon trouble in one modem (11A), only the relevant station is switched over to the modem (21A) belonging to the stand-by transmission line. When the main transmission line is broken, all the stations are simultaneously switched over to the stand-by transmission line.

9 Claims, 5 Drawing Sheets

DUPLEXED BUS TYPE NETWORK WITH FAILURE CHANGEOVER

TECHNICAL FIELD

The present invention relates to duplexing of a bus type network.

BACKGROUND ART

Hitherto, LANs (local area networks) with a bus type structure using coaxial cables, such as CSMA/CD (IEEE 802.3) type LANs and token bus (IEEE 802.4) type LANs, have been widely used. Recently, bus type networks using optical fibers and optical star couplers as transmission media have been studied.

These bus type LANs are characterized, like a ring type LAN, by freedom from the possibility that turning off the power supply of a node station may exert an influence on the total system. The bus type LANs, however, have the drawback that the total system runs down or the system must be stopped when the transmission line is broken or at the time of providing an additional station. In the ring type LAN, on the other hand, duplexing the transmission line and providing a loop-back function will prevent the system from running down upon breakage of the transmission line at one place.

Concerning a bus type network, therefore, attempts have been made to duplex the transmission line and modem portions so that normal operation of the system will be secured even upon breakage of the transmission line or failure in a modem.

Figure 8:
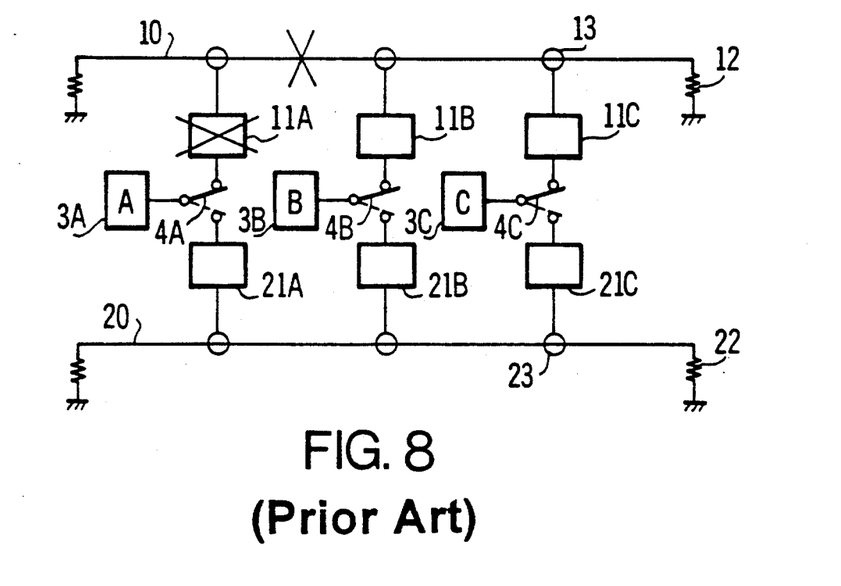
FIGS. 8, 9 and 10 respectively illustrate constructions of conventional duplexed bus type networks.

FIG. 8 shows a conventional duplexed structure in a bus type LAN which employs coaxial cables. Modems 11A, 11B, 11C and modems 21A, 21B, 21C are connected to a main transmission line 10 and a stand-by transmission line 20 through branching devices 13 and 23 and node stations 3A, 3B and 3C can selectively connect themselves to either the main transmission line 10 or the stand-by transmission line 20 by their own switches 4B, 4B and 4C, respectively. Designated by numerals 12 and 22 are terminating resistors, each of which has an impedance equal to the characteristic impedance of the transmission line.

Figure 9:
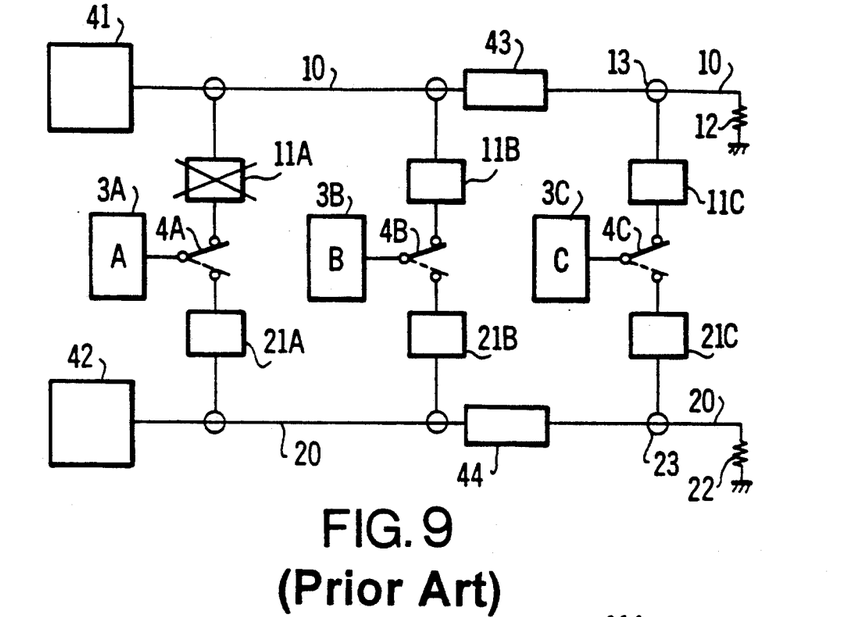

FIG. 9 shows a duplexed structure in a broadband bus type network. A main transmission line 10 and a stand-by transmission line 20 are terminated on one end side thereof respectively by terminating resistors 12 and 22, each having an impedance equal to the characteristic impedance of the transmission line. Head end remodulators 41 and 42 are provided at the other ends of the transmission lines, and two-way amplifiers 43 and 44 are provided at intermediate points of the transmission lines.

Normally, node stations 3A to 3C are connected to main modems 11A to 11C through switches 4A to 4C thereof and perform data transmission using the main transmission line 10. That is, in normal state, data output from a data terminal of one of the node stations 3A, 3B and 3C, for instance, the node station 3A is transmitted through the main modem 11A and the main transmission line 10 to the other node stations 3B and 3C.

In FIGS. 8 and 9, if a certain mode, e.g., 11A fails, the respective switches 4A, 4B and 4C at the stations are simultaneously set to the dotted line side to resume the data transmission through the modems 212A, 21B and 21C and the stand-by transmission line 20.

When the main transmission line 10 is broken, for instance, between the modem 11A and the modem 11B as indicated by the mark "X" in FIG. 8, the switches 4A to 4C are changed over to connect the stations 3A-3C to the stand-by modems 21A-21C, whereby data transmission can be performed by use of the stand-by transmission line 20.

Figure 10:
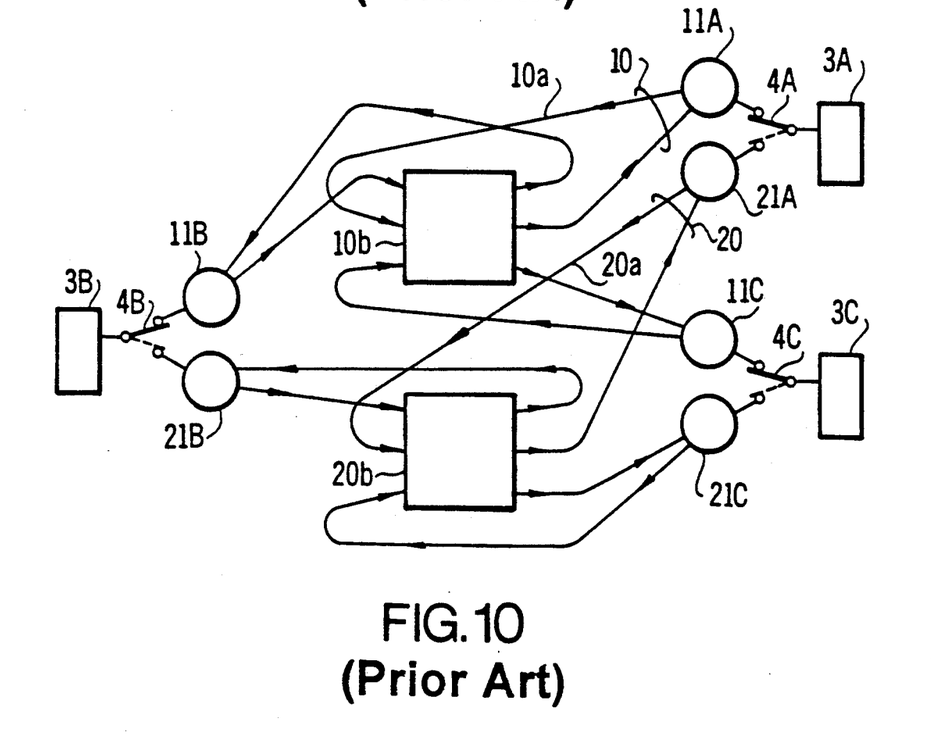

FIG. 10 shows a duplexed bus type LAN using optical fibers and optical star couplers as transmission media. A main transmission line 10 and a stand-by transmission line 20 are constructed by use of optical fiber cables 10a, 20a and star couplers 10b, 20b, and duplexed by providing modems 11A, 11B, 11C and modems 21A, 21B, 21C. Switching between the main and the stand-by system is performed by switches 4A, 4B and 4C.

The switching is carried out in the same manner as in the bus type LANs of FIGS. 8 and 9, that is, in the following manner.

In normal state, data output from a data terminal of one of the node stations 3A, 3B and 3C, for example, the node 3A is sent through the main modem 11A into the main star coupler 10a. In the star coupler 10a, the data is output evenly to each port, to be transmitted to the other node stations 3B and 3C. If a certain mode, e.g., 11B fails, the respective switches 4A, 4B and 4C at the stations are simultaneously set to the dotted-line side, to resume data transmission through the star coupler 20b, cable 20a and optical modems 21A, 21B and 21C belonging to the stand-by system.

The above-mentioned duplexed system according to the prior art, however, has following problems:

(1) Because failure in only one modem (e.g., 11A) causes switching of the modems at all the stations of the main transmission line to the corresponding ones of the stand-by system, the operation of the entire system is not ensured and a very dangerous condition results. That is, because the modems operating in normal conditions at other stations 3B and 3C than the station 3A are also switched to the stand-by modems the operations of which are not guaranteed, the reliability of the total system is not always improved by the duplexing. This applies also to the broadband type bus network;

(2) A failure occuring in a modem or a drop cable for a station does not affect information transmission among the other stations, so that it is rather difficult for all the stations to recognize the failure. Without recognition of the failure, switching to the stand-by system cannot be achieved. To obviate such a situation, special information for verifying the operating conditions of each station must be transmitted;

(3) Even if a transmission system for solving the problem in (2) above is adopted, it is still difficult to discriminate breakage of a power supply for a station and a modem failure from each other. As a result, some limitations are imposed on the greatest merit of the bus type network, namely, the merit that "the power supply at any station can be turned on and off freely"; and (4) Even after the main transmission line is broken, data transmission may be possible between the stations (e.g., 3B and 3C in FIG. 8) which do not have the breakage point therebetween. On the other hand, data transmission is impossible between the stations (e.g., 3A and 3C) having the breakage point therebetween. In this case, it is difficult for each of the stations to judge whether the power supply of the other station is turned off or the transmission line is broken. Thus, it is difficult for each station to detect a breakage of the main transmission line, by simply observing the data transmission condition.

It is accordingly one object of the present invention to provide a highly reliable duplexed bus type network which is capable of switching (changing over) only a portion associated with trouble.

It is another object of the present invention to provide a highly reliable duplexed bus type network which can easily detect breakage of a main transmission line and can switch the transmission line upon the detection.

SUMMARY OF THE INVENTION

The duplexed bus type network of the present invention comprises two transmission lines, a plurality of stations connected to a plurality of portions of both of the transmission lines through branch portions, each of the stations provided at a data input-output portion thereof with a switch and a duplexed modem portion including two modems selectable through the switch, and both of the modems being connected to the two transmission lines through the branch portions respectively, and a link transmission element for connection between the two transmission lines, wherein each station has the function of changing over from a modem of a previously selected line to a modem of the other line in response to partial failure such as a failure of its own modem and branch portion.

As the link transmission element for connection between the two transmission lines, there can be used a repeater, a changeover switch, an amplifier or the like.

Upon minor or small trouble such as failure of one modem or partial trouble such as an abnormal condition in a branch terminal of a branching device, only the station related to the trouble is switched over to the other transmission line. It is therefore possible to transmit data from the stand-by transmission line to the main transmission line or vice versa through the link transmission element, such as a repeater. The station now using the stand-by system is only the troubled station, and the switching to the stand-by system is made only in the station relevant to the troubled modem, whereas the other stations remain in the same connected conditions as in normal state, so that the same reliable data transmission as before the occurrence of the abnormal condition can be ensured.

The modem constituting a data input-output portion of each station can be accompanied by a structure in which an MAC (medium access control) layer is duplexed, and can be accompanied by a structure in which the region ranging from an LLC (logical link control) layer to an application layer is duplexed partially or entirely. In this form of network, since not only the modem but the MAC layer are duplexed at each station, the stand-by system can also be supervised during normal operation. Upon slight, local trouble such as failure in one modem, only the relevant station is switched to the other system of transmission line through the modem and the MAC layer. Therefore, data can be transmitted from the stand-by transmission line to the main transmission line or vice versa through the repeater. Because only the modem associated with the abnormal portion is switched over whereas the other stations and other elements remain in the same conditions as in normal operation, the same reliable data transmission as before the occurrence of the abnormal condition can be ensured.

That is, because the operation of the stand-by system can be supervised always, the reliability of the network as a whole can be enhanced. In addition, the stations required to be switched to the stand-by system upon the occurrence of trouble are limited to the station disabled for communication by the trouble, there is the advantage that the influence of the trouble on the network can be minimized. Consequently, there is provided a highly reliable duplexed bus type network which is free from the necessity of modification of a transmission control procedure and from a limitation on the degree of freedom.

In a form of network in which two different transmission lines are connected to each other through a changeover switch and only a station which is related to local trouble such as trouble of a modem of the station is switched to the other transmission line, it is possible to switch, upon minor local trouble in one modem or the like, only the relevant station to the other transmission line. Therefore, data transmission can be achieved from the stand-by transmission line to the main transmission line or vice versa through the changeover switch.

In this case, it is preferable that a management station for controlling the changeover switch is provided on the side of ends of the two transmission lines on which the changeover switch is disposed, and the management station operates the changeover switch to connect the ends of the two transmission lines to respective terminating resistors when the transmission line in use is broken.

A form of network in which the two-way transmission element for a connection between the two transmission lines is an amplifier is applicable to a form of broadband bus type network including branch portions at a plurality of portions of a transmission line and stations respectively connected to the branch portions so as to perform data transmission through the transmission line. In such an application, a modem portion constituting an data input-output portion of each station is duplexed, the respective modems of the stations are connected to the two transmission lines, a first head end remodulator is connected to one end of one of the two transmission lines, the other transmission line is terminated by a terminating resistor at one end thereof, and a changeover switch is so arranged that the other end of the one line and a second head end remodulator can be selectively connected with the other end of the other line through the changeover switch. Therefore, upon the occurrence of local trouble, such as a modem trouble, in this network, only the relevant station is switched to the other line. Because only the troubled modem is switched over while the other stations and other elements remain in the same conditions as in normal operation, the same reliable data transmission as before the occurrence of the abnormal condition (trouble) is ensured.

In this case, it is preferable that a first head end remodulator is connected to one end of a normally used transmission line at which end the amplifier is not disposed, a terminating resistor is connected to one end of the other system at which end the amplifier is not disposed, the other end of the line for a normal use is connected to one input-output terminal of the amplifier, the other end of the other line is connected to the other input-output terminal of the amplifier via the change over switch, and a downward-signal sensor for detecting a cutoff of a downward signal sent from the first head end remodulator and for changing over the changeover switch from the amplifier to the second head end remodulator is connected to the other end of the line for normal use. Upon the occurrence of serious trouble such as failure in the main transmission line or the head end remodulator for the main transmission line, the changeover switch is changed to the side of the second head end remodulator for the stand-by transmission line by the downward-signal sensor and other elements, whereby communication of information can be maintained by use of only the stand-by transmission line.

In any of the above-mentioned forms of network, the stations can each be provided further with the function of operating its own switch to make changeover from a modem of a previously selected transmission line to a modem of the other transmission line when the previously selected transmission line or the transmission line in use is broken.

It is also possible to provide network supervising stations respectively connected to both ends of the normally used transmission line, both the network supervising stations designed to transfer supervisory data periodically therebetween so as to detect breakage of the transmission line and, upon the detection of breakage of the transmission line, to inform each station of the detection of the breakage. In this case, each station may be provided with the function of operating its own switch to make a changeover from a modem of a previously selected transmission line to a modem of the other transmission line upon being informed of the detection of the breakage of the previously selected transmission line.

In this form of network, the two network supervising stations respectively connected to both ends of the transmission line transfer the supervisory data periodically therebetween. Therefore, when one of the network supervising stations cannot receive the supervisory data from the other network supervising station, it is judged that the transmission line has been broken. In such a situation, the supervising station which cannot receive the supervisory data informs each station that the transmission line has been broken, and causes a changeover from the main transmission line to the stand-by transmission line. In short, the operation of the network supervising stations of detecting a breakage of the transmission line and informing each station of the breakage of the transmission line enables changeover of the transmission line. Thus, it is made possible to achieve assured and easy detection of a breakage of the transmission line, which detection has been difficult to accomplish in the conventional form of network, and it is possible to construct a highly reliable network.

The two different transmission lines can be constructed by use of coaxial fibers or by use of optical star couplers and optical fibers.

BEST MODES FOR CARRYING OUT THE INVENTION

The present invention will now be explained in more detail while referring to the accompanying drawings.

Figure 1:
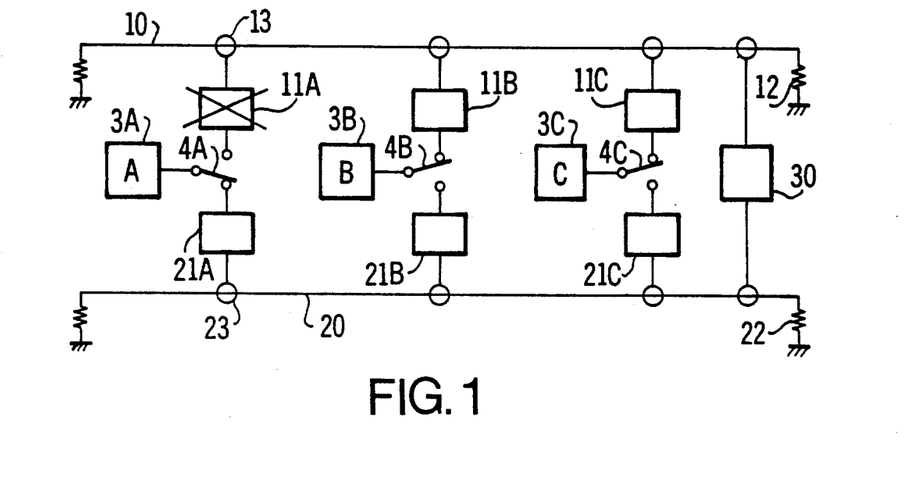
FIGS. 1, 2, 3, 4, 5, 6 and 7 respectively illustrate constructions of preferred embodiments of a duplexed bus type network according to the present invention.

FIG. 1 shows a first embodiment of a duplexed bus type LAN employing coaxial cables. This is a bus type network comprising branch portions provided at a plurality of portions of a transmission line and node stations respectively connected to the branch portions so as to perform data transmission between the node stations through the transmission line, wherein a modem portion constituting a data input-output portion of each station is duplexed, the modems are connected to two different transmission lines, which are connected to each other by a repeater, and upon partial trouble such as a trouble in the modem of one station, only the station having the trouble is switched to the other transmission line.

In FIG. 1, numerals 10 and 20 designate a main transmission line and a stand-by transmission line respectively, which include coaxial cables, and they are terminated at both ends thereof by resistors 12 and 22, each having an impedance qual to the characteristic impedance of the transmission line. To the main transmission line 10, there are connected modems 11A, 11B and 11C through a plurality of branching devices 13. Similarly, modems 21A, 21B and 21C are connected with the stand-by transmission line 20 through branching devices 23. Node stations 3A, 3B and 3C, when sending data, can be connected with either one of the pair of modems thereof by its own switches 4A, 4b and 4C respectively.

The main transmission line 10 and the stand-by transmission line 20 are connected to each other by a link transmission element, which is a repeater 30 in this embodiment, so that data in the main line can be transmitted to the stand-by line, and data generated in the stand-by line can be transmitted to the main line.

In the normal state, the switches 4A, 4B and 4C of the stations 3A, 3B and 3C are by connected to the main line side, and data transmission is performed through the main transmission line 10 only.

Figure 2:
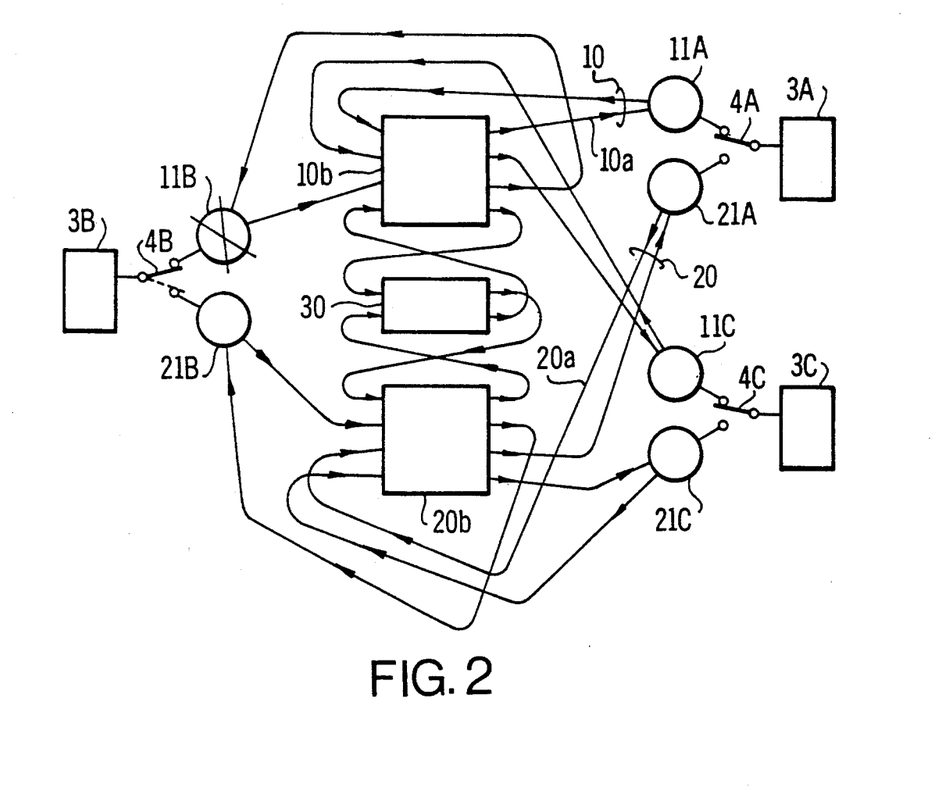

When trouble occurs in one of the modems 11A, 11B and 11C belonging to the main line in use, for instance, in the modem 11A of the station 3A as indicated by the mark "X" in FIG. 2, the station 3A detects the trouble and changes over its switch 4A from the side of the modem 11A to the side of the modem 21A. Therefore, only the station 3A is changed to the stand-by transmission line 20. Data transfer between the station 3A and the other stations 3B and 3C is carried out through the repeater 30.

When breakage of the main transmission line 10 occurs, for instance, data sending and receiving on the main transmission line side is assumed to be impossible because of the effects of reflections of signals in the coaxial cable. In such an instance, therefore, all the stations 3A, 3B and 3C change over their switches 4A, 4b and 4C to the side of the modems 21A, 21B and 21C belonging to the stand-by line respectively, thereby transferring data through the stand-by transmission line 20.

Thus, upon partial trouble such as trouble in the modem of one station or an abnormal condition in a branch terminal of one branching device, only the portion associated with the trouble is changed to the stand-by system, thereby transferring data in the same manner as in normal state. Because the other stations remain in the same connected conditions as in the normal state, the same reliable data transmission as before the occurrence of the abnormality is ensured. As compared with a duplexed system according to the prior art, this duplexed system can be constructed by simply adding one repeater, with a small increase in cost.

FIG. 2 illustrates an embodiment of a duplexed bus type LAN which uses optical fibers and optical star couplers as transmission media. This is a bus type network comprising star couplers whose input-output terminals are connected through cables with modems of data terminals to perform data transmission between the data terminals, wherein the star couplers, cables and modems are duplexed, pairs of input-output terminals of the star couplers are connected to each other by a repeater, and, upon partial trouble such as trouble in the modem of one station, only the trouble-related station is switched to the other system of transmission line.

First, similar to the prior art (FIG. 10), a main transmission line 10 and a stand-by transmission line 20 which respectively include optical fibers 10a, 20a and star couplers 10b, 20b and modems 11A, 11B, 11C and 21A, 21B, 21C are used to construct a dual network, and switches 4A, 4B and 4C are used to effect switching between the main line and the stand-by line.

This embodiment differs from the conventional duplexed network of FIG. 10 in that the star coupler 10b belonging to the main transmission line and the corresponding star coupler 20b belonging to the stand-by transmission line are connected to each other by the repeater 30. The repeater 30 can perform two-way transmission, and enables transmission of data from the main line to the stand-by line as well as from the stand-by line to the main line.

In normal state, three node stations 3A, 3B and 3C transfer data therebetween through the main transmission line 10. However, when trouble occurs in one modem, e.g., the modem 11B indicated by the mark "X" in FIG. 2, only the switch 4B of the node station 3B relevant to the troubled modem is changed to the dotted-line side. Data output from the station 3B having the switch thus changed over is transmitted through the stand-by star coupler 25, the repeater 30 and the main star coupler 15 to the stations 3A and 3C of the main line. Data output from the station 3A and 3C of the main line is transmitted in the reverse route.

Figure 3:
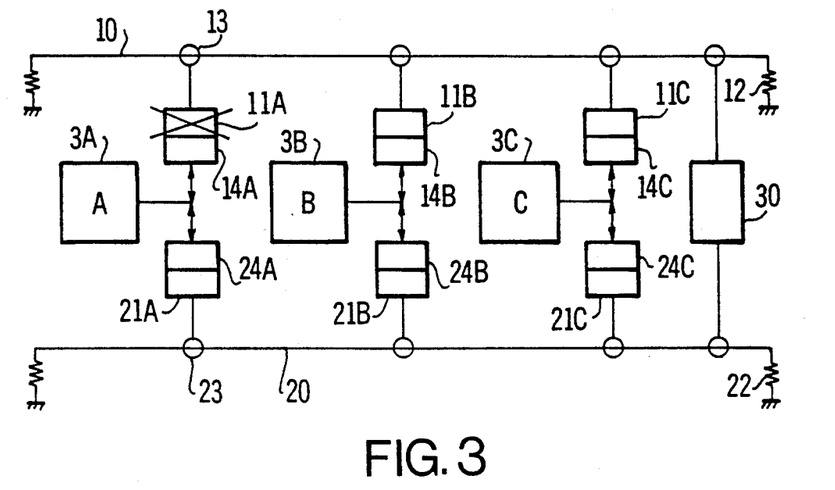

FIG. 3 shows a second embodiment of a duplexed bus type LAN employing coaxial calbes, in which a modem and a MAC (media access control) layer constituting a data input-output portion of each station are duplexed.

In FIG. 3, modems 11A, 11B and 11C provided with MAC layers 14A, 14B and 14C are connected by a plurality of branching devices 13 to a main transmission line 10. The main transmission line is terminated at both ends thereof by resistors 12, each having an impedance equal to the characteristic impedance of the transmission line.

Similarly, modems 21A, 21B and 21C provided with MAC layers 24A, 24B and 24C are connected by a plurality of branching devices 23 to a stand-by transmission line 20. The stand-by transmission line is terminated at both ends thereof by resistors 22, each having an impedance equal to the characteristic impedance of the transmission line. Stations 3A, 3B and 3C intended to transfer data therebetween are connected to the corresponding MAC layers of the main line and the stand-by line so that each station is capable of operating the MAC layers and the modems of the two lines simultaneously.

The main transmission line 10 and the stand-by transmission line 20 are connected with each other via a repeater 30 so that data generated in the main line can be transmitted to the stand-by line, and data generated in the stand-by line can be transmitted to the main line.

In normal state, the stations send and receive data by use of the MAC layers 14A to 14C and modems 11A to 11C belonging to the main line. At the same time, the MAC layers 24A to 24C and modems 21A to 21B belonging to the stand-by line are operated only to receive data. Data of the main line to be sent to the stand-by line is received through the repeater 30. The data received through the main line only and the data received via the stand-by line are compared with each other, in order to supervise the two lines.

If trouble occurs in one of the main modems 11A, 11B and 11C, for instance, the modem 11A of the station 3A as indicated by the mark "X" in FIG. 3, only the station 3A starts transferring data by use of the MAC layer 24A and the modem 21A which belong to the stand-by line. The data transfer between the station 3A and the other stations 3B and 3C is performed via the repeater 5.

If the main transmission line 10 is broken, data transfer on the main system side is assumed to be impossible because of the reflection of signals at the breakage point. In such an instance, therefore, all the stations are switched over to the stand-by transmission line, thereby transferring data through the stand-by transmission line.

Thus, upon partial trouble such as trouble in the modem of one station and an abnormal condition in a branch terminal of one branching device, only the relevant station is switched over to the stand-by line, which enables data transfer in the same manner as in the normal state. Because the other stations remain in the same conditions as in the normal state, the same reliable data transfer as before the occurrence of the abnormal condition can be ensured.

Although the MAC layers were duplexed in the above embodiment, the region ranging from an LLC (logical link control) layer to an application layer may be duplexed partially or entirely.

The duplexed bus type LAN of the present invention is also applicable to LANs of the CSMA/CD (IEEE 802.3) type and LANs of the token bus (IEEE 802.4) type. In the case of the token bus type, particularly, MAC layers and modems of the stand-by line may be also incorporated into a logical ring to transfer the tokens. When performing only a receiving operation, the modems can supervise only the receiving portions, but when transferring the tokens, the modems can also supervise the transmitting portions.

The incorporation of the stand-by line system into the logical ring enables the following two switching methods to avoid trouble:

(1) Once the stand-by line is released from the logical ring, then the station address of the MAC layer of the stand-by line is changed to an address of the main line, and the stand-by line is again incorporated into the logical ring to perform data transfer; and (2) The station address of the MAC layer of the stand-by line is left unchanged, and only the source address in a transmission data frame is substituted by an address of the main line. Such a method can be used because some transmission control LSIs for MAC layers in a token bus are so designed that the source address in a data frame can be set independently of the station address for transfer of tokens.

By employing either one of the above methods (1) and (2), the stations other than the troubled station can maintain the functions for the network, without being aware of the changeover to the stand-by line.

Figure 4:
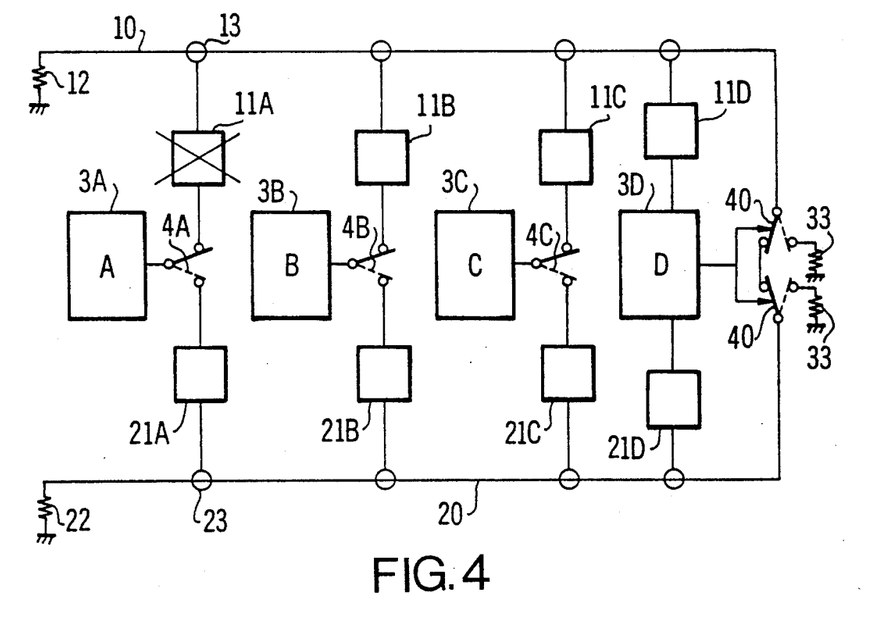

FIG. 4 shows an embodiment of a duplexed bys type LAN using a changeover switch.

In FIG. 4, a main transmission line 10 and a stand-by transmission line 20, which comprises coaxial cables, are respectively terminated at both ends thereof by resistors 12, 33 and 22, 33, each having an impedance equal to the characteristic impedance of the transmission line. To the main transmission line 10, there are connected modems 11A, 11B and 11C by a plurality of branching devices 13. Likewise, modems 21A, 21B and 21C are connected to the stand-by transmission line 20 by branching devices 23. Each of stations 3A, 3B and 3C for transmitting and receiving data can be connected to either of the pair of modems by its own switches 4A, 4B and 4C respectively.

The main transmission line 10 and the stand-by transmission line 20 are connected to each other by a changeover switch 40 so that data in the main transmission line can be transmitted to the stand-by transmission line, and data generated in the stand-by transmission line can be transmitted to the main transmission line. Designated by a numeral 3D is a management station for controlling the changeover switch 40, which is connected to the main transmission line 10 through a modem 11D and a branching device 13 and to the stand-by transmission line 20 via a modem 21D and a branching device 23.

In the normal state, the respective switches 4A, 4B and 4C of the stations 3A, 3B and 3C are connected to the main line, and data transfer is performed through the main transmission line 10 only.

When trouble occurs in any of the modems 11A, 11B and 11C belonging to the main line in use, for example, the modem 11A of the station 3A as indicated by the mark "X" in FIG. 4, the station 3A changes over the switch 4A from the side of the modem 11A to the side of the modem 21A. As a result, only the station 3A is changed to the stand-by transmission line 20. Transfer of data between the station 3A and the other stations 3B and 3C is carried out through the changeover switch 40 which connects the two transmission lines.

Upon breakage of the main transmission line 10 or other similar failure, the transfer of data on the main line side is assumed to be impossible due to the effects or reflection of signals in the coaxial cable. In such an instance, therefore, the management station 3D which has detected the breakage of the main transmission line 10 gives an instruction to perform a change over of the changeover switch 40 to the side of the terminating resistor 33. In response to this changeover, all the stations 3A, 3B and 3C respectively change the switches 4A, 4B and 4C over to the side of the modems 21A, 21B and 21C belonging to the stand-by transmission line, in order to transfer data by use of the stand-by transmission line 20.

Therefore, upon partial trouble such as a trouble in the modem of one station and an abnormality in a branch terminal of one branching device, only the relevant portion is switched to the stand-by transmission line, thereby transferring data in the same manner as in the normal state. Because the other stations remain in the same conditions as in normal state, the same reliable data transmission as before the occurrence of the abnormal condition can be ensured. As compared with the duplexed system according to the prior art, furthermore, the system of this embodiment can be constructed simply by adding one changeover switch, with a small increase in cost.

Figure 5:
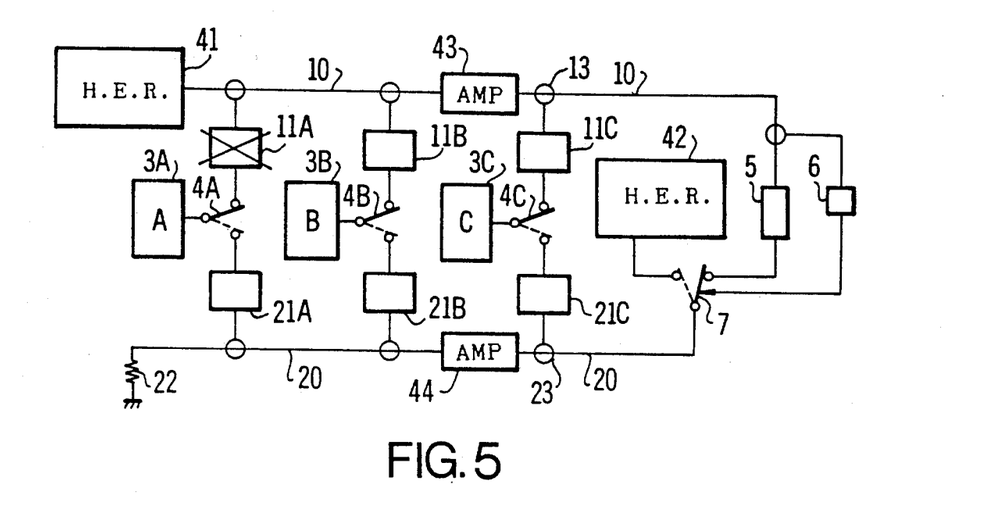

FIG. 5 shows an embodiment of a broad band type duplexed bus LAN in which two-way amplifiers are used.

In FIG. 5, a head end remodulator 41 for a main transmission line is connected to one end (left-hand end in the figure) of the main transmission line 10. To the other end of the main transmission line 10, there is connected one end of a link two-way amplifier 5, which is provided as a link transmission element.

On the other hand, to one end (left-hand end in the figure) of a stand-by transmission line 20 is connected to a terminating resistor 22 having an impedance equal to the characteristic impedance of the transmission line. To the other end of the stand-by transmission line 20, a head end remodulator 42 for the stand-by transmission line or the link two-way amplifier 5 is selectively connected through a changeover switch 7. In other words, the other end of the link two-way amplifier 5 and the head end remodulator 42 for the stand-by transmission line are connected with the stand-by transmission line 20 alternatively and switchably via the changeover switch 7. The changeover switch 7 is alternatively switched under control of a downward-signal sensor 6 provided at one end of the link two-way amplifier 5, namely, connected to the other end of the main transmission line 10.

Meanwhile, two-way amplifiers 43 and 44 are provided on the main and stand-by transmission lines 10 and 20 respectively.

In the normal state (normal operation), respective switches 4A, 4B and 4C of the stations 3A, 3B and 3C are set on the main transmission line side and the link changeover switch 7 is controlledly set on the two-way amplifier side so that data transfer is performed through the main transmission line 10 only.

Upon the occurrence of trouble in one of the modems 11A, 11B and 11C belonging to the main line in use, for example, in the modem 11A of the station 3A as indicated by the mark "X" in FIG. 5, the station 3A changes over the switch 4A from the side of the modem 11A to the side of the modem 21A. As a result, only the station 3A is switched over to the stand-by by transmission line 20. Therefore, transfer of data between the station 3A and the other stations 3B and 3C is performed via the link two-way amplifier 5 by which the two transmission lines are interconnected.

Upon breakage of the main transmission line 10 or a similar failure, on the other hand, the data transfer on the main transmission line side is assumed to be impossible due to reflection of signals at the breakage point. Therefore, the modems of all the stations are switched over to the stand-by transmission line. At the same time, the downward-signal sensor 6 detects the failure through a cutoff of a downward signal sent from the head end remodulator 41 of the main transmission line, and changes over the changeover switch 7 to the head end remodulator 42 of the stand-by transmission line. Thus, all the apparatuses in the network are connected to the stand-by transmission line, and transfer of data is carried out by use of the stand-by transmission line 20.

As mentioned above, the two-way amplifier, the downward-signal sensor and the changeover switch are disposed between the main transmission line and the stand-by transmission line and, upon partial trouble such as a trouble in the modem of a station or an abnormality in a branch terminal of a branching device, only the portion related to the trouble is switched over to the stand-by line, thereby transferring data in the same manner as in normal state. Because the other stations remain in the same conditions as in the normal state, the same reliable data transmission as before the occurrence of the abnormal condition can be ensured. As compared with a duplexed system according to the prior art, furthermore, the duplexed system of this embodiment can be constructed simply by adding one two-way amplifier, one changeover switch and one downward-signal sensor. An additional expense for these elements is considered to be small.

Upon serious failure such as a failure in the main transmission line or in the head end remodulator for the main transmission line, on the other hand, the downward-signal sensor changes over the changeover switch, whereby the head end remodulator for the stand-by transmission line is operated to maintain information communication by use of the stand-by transmission line alone.

Figure 6:
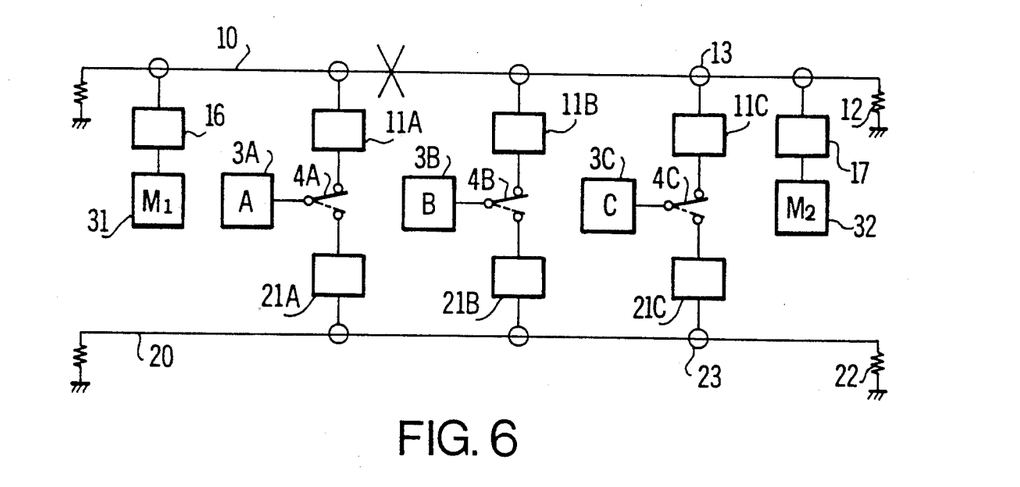
Figure 7:
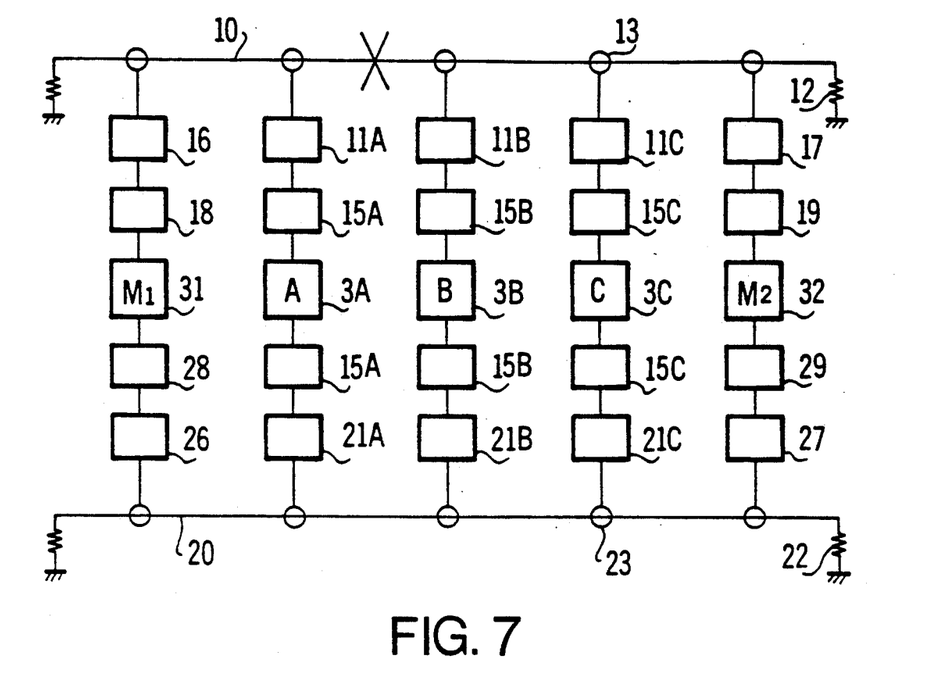

FIG. 6 shows a fifth embodiment of a duplexed bus type LAN using coaxial cables.

In FIG. 6, network supervising stations 31 and 32 are connected to a main transmission line 10 by modems 16 and 17, in the vicinity of each end of the transmission line.

In normal state, respective switches 4A, 4B and 4C of stations 3A, 3B and 3C are connected to the main line side, and data is transferred by use of the main transmission line 10 only.

The network supervising stations 31 and 32 which are connected to the main transmission line 10 in the vicinity of the ends of the transmission line transfer network supervisory data periodically therebetween through the main transmission line 10 and observe the reception of the supervisory data from the opposite supervising station 32 and 31.

Upon breakage of the main transmission line 10, for instance, at a point between modems 11A and 11B as indicated by the mark "X" in FIG. 6, the network supervising stations 31 and 32 can no longer receive the supervisory data from the opposite supervising station 32 and 31. When the network supervising station 31 (or 32) does not receive the supervisory data from the opposite network supervising station 32 (or 31) over a period of time longer than the data transmission period of the opposite supervising station, it is judged that the main transmission line 10 has been broken.

The two network supervising stations 31 and 32 inform the other stations 3A, 3B and 3C of the breakage of the main transmission line 10, by continuously outputting a transmission line breakage informing signal onto the main transmission line 10 through the modems 16 and 17 of their own. The transmission line breakage informing signal includes, for example, a signal which is distinguished by each station as a noise.

We claim:

1. A duplexed bus type network comprising:
   two transmission lines;
   a plurality of stations connected to a plurality of portions of both of the transmission lines through branch portions, each station being provided at a data input-output portion thereof with a switch and a duplexed modem portion, the duplexed modem portion having two modems selectable through the switch, the modems being respectively connected to the two transmission lines through the branch portions; and
   a changeover switch for connecting the two transmission lines with each other, each station functioning to change over from a modem of a previously selected line to a modem of the other line upon a partial failure such as a failure of its own modem and branch portion.

2. The duplexed bus type network as set forth in claim 1, including a management station for controlling the changeover switch on the side of the ends of the two transmission lines on which the changeover switch is disposed, and the management station operates the changeover switch to connect the ends of the two transmission lines to respective terminating resistors when the transmission line is use is broken.

3. The duplexed bus type network as set forth in claim 1, wherein each station functions to operate the switch thereof to made a changeover from a modem of a previously selected transmission line to a modem of the other transmission line when the transmission line in use is broken.

4. The duplexed bus type network as set forth in claim 1, wherein the network supervising stations are respectively connected to both ends of the normally used transmission line in a manner such that both of the network supervising stations transfer supervisory data periodically therebetween so as to detect a breakage of the normally used transmission line and, upon the detection of breakage of the normally used transmission line, to inform each node station of the detection of the breakage, and each node station functions to operate the switch thereof to make a changeover from a modem of the normally used or previously selected transmission line to a modem of the other transmission line upon being informed of the detection of the breakage of the previously selected transmission line.

5. The duplexed bus type network as set forth in claim 1, wherein the transmission lines are coaxial cables.

6. The duplexed bus type network as set forth in claim 1, wherein the transmission lines include an optical star coupler and an optical fiber.

7. A duplexed bus type network comprising:
   two transmission lines;
   a plurality of stations connected to a plurality of portions of both of the transmission lines through branch portions, each station being provided at a data input-output portion thereof with a switch and a duplexed modem portion, the duplexed modem portion having two modems selectable through the switch, the modems being respectively connected to the two transmission lines through the branch portions; and
   an amplifier for connecting the two transmission lines with each other, each station functioning to change over from a modem of a previously selected line to a modem of the other line upon partial failure such as a failure of the modem of the previously selected line and the corresponding branch portion.

8. The duplexed bus type network as set forth in claim 7, including a first head end remodulator connected to one end of a normally used one of the two transmission lines at which end the amplifier is not disposed, a terminating resistor is connected to one end of the other transmission line at which end the amplifier is not disposed, the other end of the transmission line for normal use is connected to one input-output terminal of the amplifier whereas the other end of the other transmission line is connected to the other input-output terminal of the amplifier through the changeover switch, and a downward-signal sensor for detecting a cutoff of a downward signal sent from the first head end remodulator and changing over the changeover switch from the amplifier to a second head end remodulator is connected to the other end of the transmission line for normal use.

9. A duplexed bus type network comprising branch portions at a plurality of portions of a transmission line system, the transmission line system including two transmission lines, node stations respectively connected to the branch portions so as to perform data transmission between the node stations through the transmission line system, a modem portion and a transmission control device portion constituting an input-output portion of each node station, each modem portion and transmission control device portion being duplexed and connected to one of the transmission lines, network supervising stations respectively connected to ends on one side and end on the other side of the two transmission lines, both of the network supervising stations transferring supervisory data periodically therebetween so as to detect breakage of the transmission line and, upon detection of breakage of the transmission line, to inform each node station of the detection of the breakage, each node station functioning to make a changeover from a modem and a transmission control device of a previously selected transmission line to a mode and a transmission control device of the other transmission in, upon being informed of the detection of the breakage of the transmission line.

* * * * *